(12) United States Patent
Kashima (10) Patent No.: US 8,234,856 B2
(45) Date of Patent: Aug. 7, 2012

(54) EXHAUST EMISSION CONTROL SYSTEM FOR INTERNAL COMBUSTION ENGINE

(75) Inventor: Soji Kashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 12/467,554

(22) Filed: May 18, 2009

(65) Prior Publication Data

US 2009/0282819 A1 Nov. 19, 2009

(30) Foreign Application Priority Data

May 19, 2008 (JP) ................................. 2008-131300

(51) Int. Cl.
F01N 3/00 (2006.01)
(52) U.S. Cl. ............................................. 60/293; 60/306
(58) Field of Classification Search ..................... 60/293, 60/304, 305, 306; 123/568.18, 568.29, 108
See application file for complete search history.

(56) References Cited

U.S. PATENT DOCUMENTS

| | | | | |
|---|---|---|---|---|
| 4,132,198 | A | | 1/1979 | Masaki et al. |
| 4,177,640 | A | * | 12/1979 | Kuroda et al. ................. 60/274 |
| 4,207,738 | A | * | 6/1980 | Yoneda et al. ................. 60/278 |
| 4,325,346 | A | * | 4/1982 | Yokoyama .................... 123/308 |
| 4,499,724 | A | * | 2/1985 | Ikenoya et al. ................. 60/290 |
| 4,590,762 | A | * | 5/1986 | Mifuji et al. ................... 60/293 |
| 2005/0178370 | A1 | * | 8/2005 | Kashima et al. ........ 123/568.14 |

FOREIGN PATENT DOCUMENTS

| | | |
|---|---|---|
| DE | 2640941 A1 | 3/1977 |
| FR | 2687730 A1 | 8/1993 |
| JP | 52-109027 A | 9/1977 |
| JP | 2535339 Y2 | 5/1997 |
| JP | 2001-355440 A | 12/2001 |
| JP | 2005120961 A * | 5/2005 |
| JP | 2005-240793 A | 9/2005 |
| JP | 2006-329003 A | 12/2006 |
| JP | 2007-231766 A | 9/2007 |

OTHER PUBLICATIONS

JP 2005-120961 Translation.* European Search Report dated Aug. 17, 2009, issued in corresponding European Patent Application No. 09160395.
Japanese Office Action dated Nov. 30, 2011, issued in corresponding Japanese Patent Application No. 2008-131300.
Japanese Office Action dated May 2, 2012, issued in corresponding Japanese Patent Application No. 2008-131300, 3 pages.

* cited by examiner

*Primary Examiner* — Thomas Denion
*Assistant Examiner* — Patrick Maines
(74) *Attorney, Agent, or Firm* — Westerman, Hattori, Daniels & Adrian, LLP (57) ABSTRACT

In an exhaust emission control system for an internal combustion engine, an exhaust gas recirculation device that operates so as to partially open an exhaust valve to introduce exhaust gas into a cylinder in an intake stroke is provided; a secondary air passage capable of supplying secondary air to an exhaust passage is connected to the exhaust passage; and a one-way valve opened by negative pressure applied from the cylinder to the exhaust passage following an operation of the exhaust gas recirculation device in the intake stroke is provided in the secondary air passage. Accordingly, it is possible to provide an exhaust emission control system for an internal combustion engine that allows secondary air to be supplied into an exhaust passage to reduce HC and CO concentrations and also a NOx concentration in an exhaust gas without using an air pump regardless of an exhaust system structure of the internal combustion engine.

6 Claims, 11 Drawing Sheets

DECOMPRESSION STATE (Ne < Ne1)

FIG.6

DECOMPRESSION RELEASE STATE (Ne > Ne1)

FIG. 7

EXHAUST GAS RECIRCULATION STOP STATE (Ne < Ne2)

FIG.8

EXHAUST GAS RECIRCULATION STATE (Ne > Ne2)

EXHAUST EMISSION CONTROL SYSTEM FOR INTERNAL COMBUSTION ENGINE

BACKGROUND OF THE INVENTION

1. Field of the Invention

The present invention relates to an exhaust emission control system for an internal combustion engine which supplies secondary air into an exhaust passage to oxidize and remove HC and CO in an exhaust gas, and which introduces an exhaust gas into a cylinder in an intake stroke to prevent generation of NOx during combustion.

2. Description of the Related Art

Japanese Utility Model Registration No. 2535339 discloses an exhaust emission control system for an internal combustion engine including: a secondary air passage connected to an exhaust passage; and a one-way valve that is provided in the secondary air passage and opened by negative pressure by exhaust pulsation in an exhaust stroke in order to supply secondary air into the exhaust passage to oxidize and remove HC and CO in an exhaust gas. Japanese Patent Application Laid-Open No. 2005-240793 also discloses an exhaust emission control system for an internal combustion engine including an exhaust gas recirculation device that operates so as to partially open an exhaust valve to introduce an exhaust gas into a cylinder in an intake stroke in order to prevent generation of NOx during combustion by introducing exhaust gas into the cylinder in the intake stroke.

For an internal combustion engine having high muffler back pressure or a short exhaust passage length, sufficient negative pressure by exhaust pulsation is not created in an exhaust passage. Thus, even if the exhaust emission control system disclosed in the above-described Japanese Utility Model Registration No. 2535339 is employed, the one-way valve in the secondary air passage is not opened, and secondary air cannot be supplied to the exhaust passage, thereby preventing a desired effect from being obtained. In such a case, an air pump is connected to the secondary air passage to pump the secondary air into the exhaust passage, but the use of the air pump increases the cost of the exhaust emission control system.

SUMMARY OF THE INVENTION

The present invention is achieved in view of these circumstances, and has an object to provide an exhaust emission control system for an internal combustion engine that allows secondary air to be supplied into an exhaust passage to reduce HC and CO concentrations and also a NOx concentration in an exhaust gas by using an exhaust gas recirculation device without using an air pump regardless of an exhaust system structure of the internal combustion engine.

In order to achieve the object, according to a first feature of the present invention, there is provided an exhaust emission control system for an internal combustion engine comprising: an exhaust gas recirculation device that operates so as to partially open an exhaust valve to introduce an exhaust gas into a cylinder in an intake stroke; a secondary air passage that is connected to an exhaust passage and can supply secondary air to the exhaust passage; and a one-way valve that is provided in the secondary air passage and opened by negative pressure applied from the cylinder to the exhaust passage following an operation of the exhaust gas recirculation device in the intake stroke.

According to the first feature of the present invention, the exhaust gas recirculation device operates to partially open the exhaust valve in the intake stoke. This causes an exhaust gas remaining in the exhaust passage to be drawn into the cylinder, that is, the exhaust gas is recirculated. This prevents an excessive increase in combustion temperature during combustion of air-fuel mixture to reduce a NOx concentration in the exhaust gas. Further, in the intake stroke, the exhaust valve is partially opened and the negative pressure in the cylinder is applied to the exhaust passage. The negative pressure opens the one-way valve to bring the secondary air passage into communication with the exhaust passage, the secondary air is drawn into the exhaust passage and further into the cylinder, and the secondary air drawn into the exhaust passage remains in the exhaust passage. Thus, the remaining secondary air reacts with HC and CO in the exhaust gas exhausted to the exhaust passage in a later exhaust stroke to reduce HC and CO concentrations in the exhaust gas. Further, the secondary air drawn into a combustion chamber increases charging efficiency in a cylinder bore to increase an output of the engine. This can reduce HC and CO concentrations and also a NOx concentration in the exhaust gas and increase an output of the engine without using an air pump regardless of an exhaust system structure of the internal combustion engine.

According to a second feature of the present invention, in addition to the first feature, a valve box that houses the one-way valve is formed in a head cover coupled to a cylinder head.

According to the second feature of the present invention, the need for a special support structure for the valve box for the one-way valve can be eliminated.

According to a third feature of the present invention, in addition to the first feature, a valve box that houses the one-way valve is mounted to an exhaust pipe coupled to a cylinder head.

According to the third feature of the present invention, the valve box for the one-way valve can be set using dead space around the exhaust pipe.

The exhaust passage corresponds to an exhaust port 16a and an exhaust pipe 65 of an embodiment of the present invention explained below. The cylinder corresponds to a cylinder bore 3a.

The above description, other objects, characteristics and advantages of the present invention will be clear from detailed descriptions which will be provided for the preferred embodiments referring to the attached drawings.

DESCRIPTION OF THE PREFERRED EMBODIMENTS

A first embodiment of the present invention will be explained below based on FIGS. 1 to 10.

Figure 1:
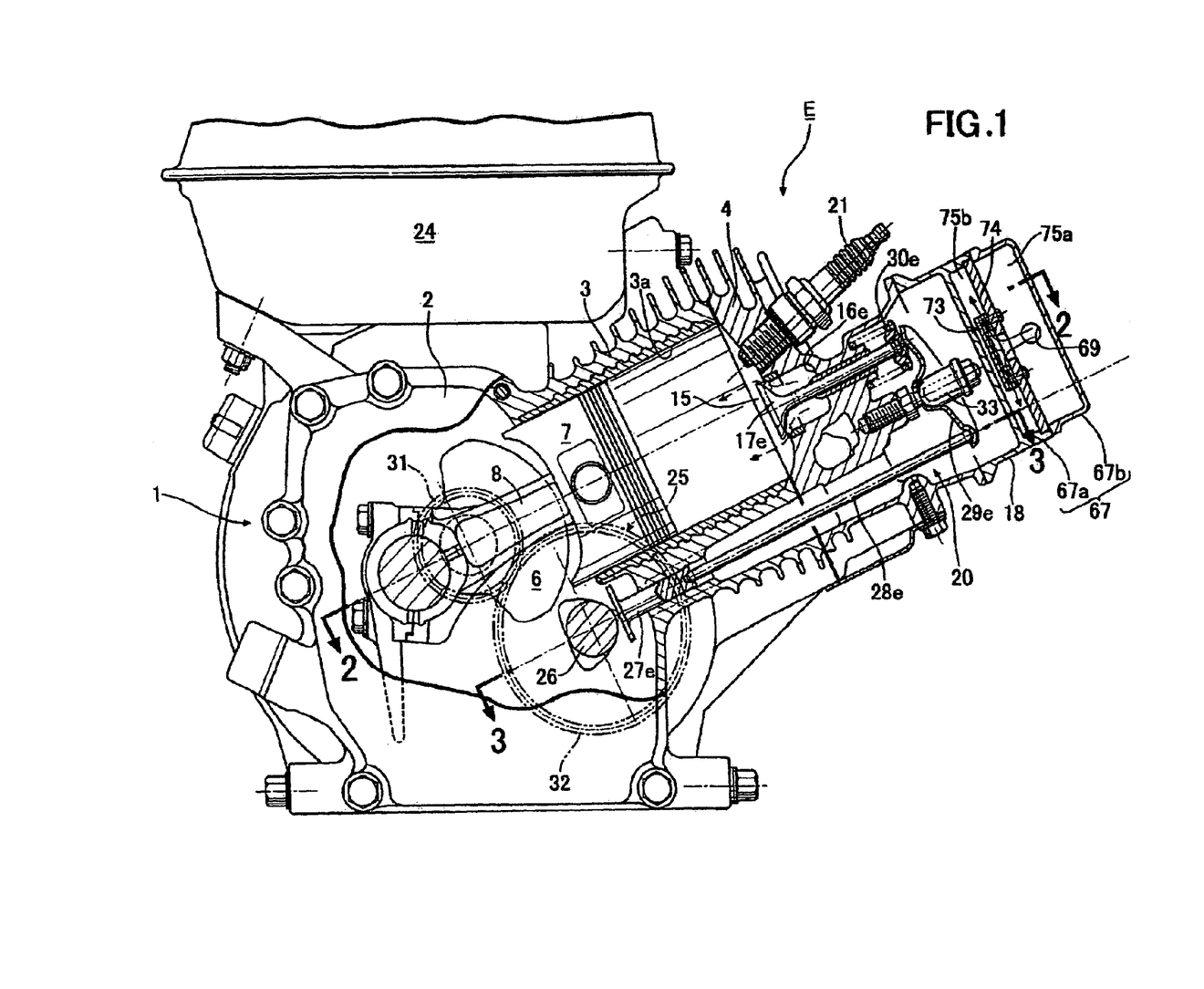
FIG. 1 is a vertical sectional side view of an internal combustion engine including a valve operating system according to a first embodiment of the present invention.
Figure 2:
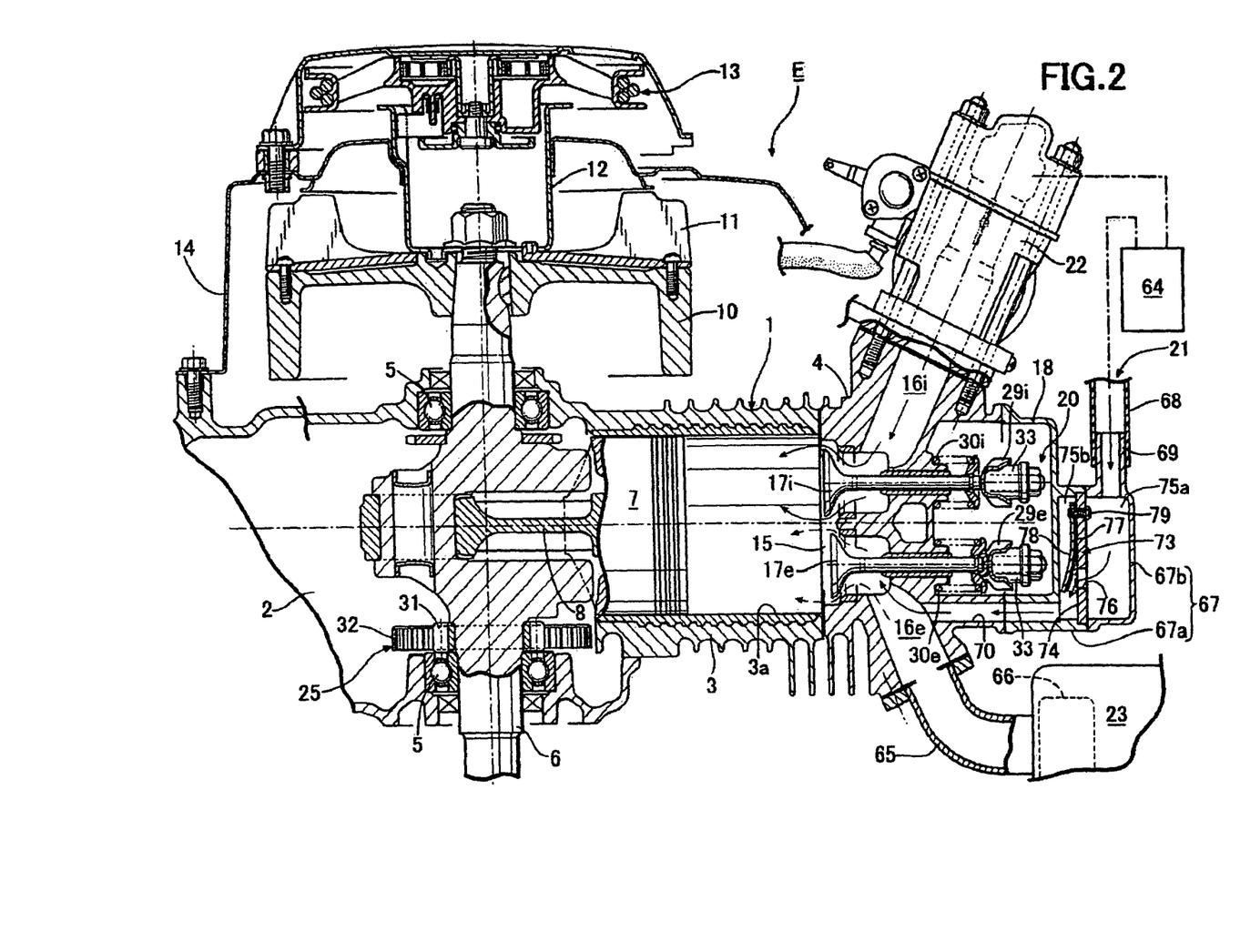
FIG. 2 is a sectional view taken along the line 2-2 in FIG. 1.
Figure 3:
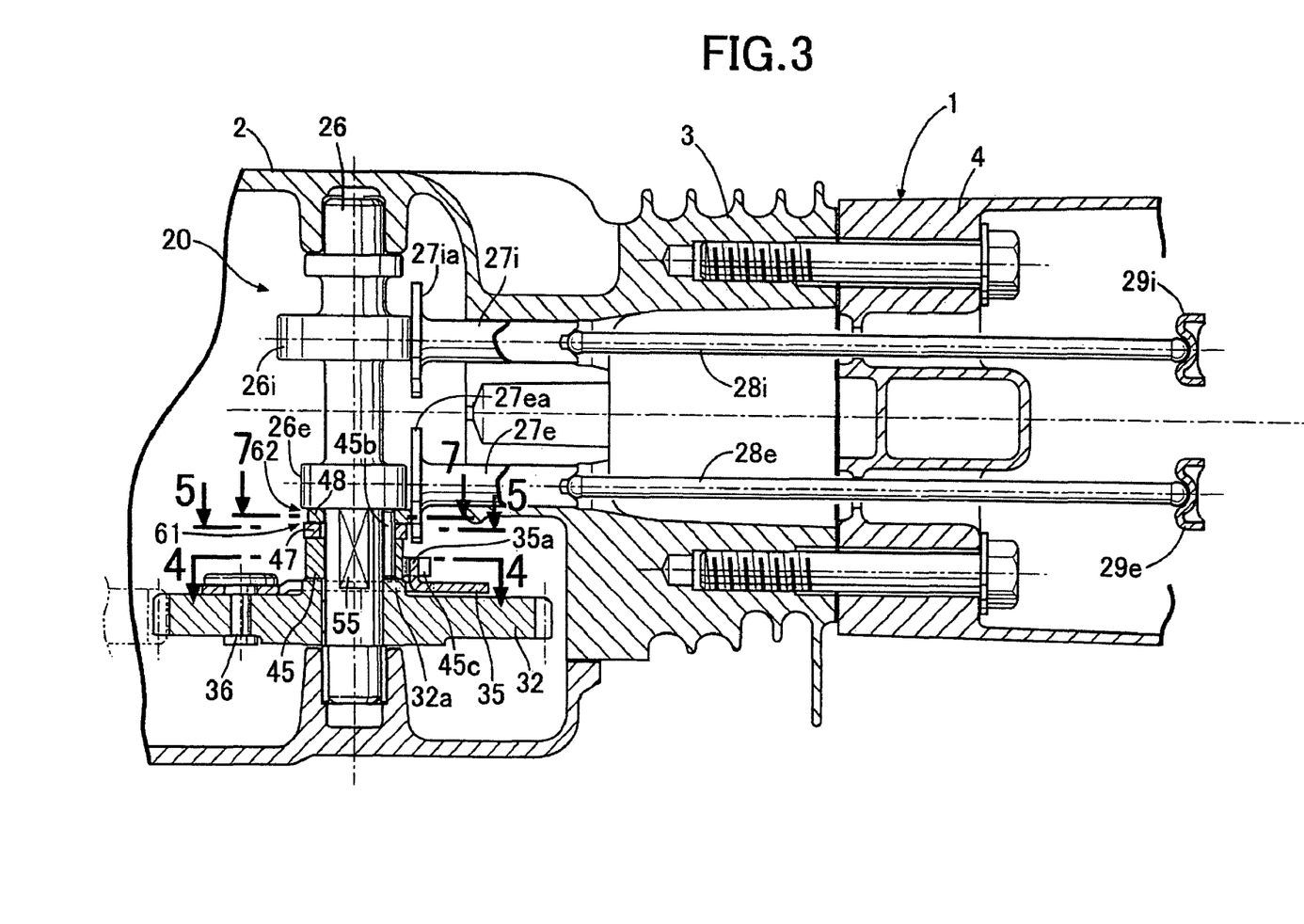
FIG. 3 is a sectional view taken along the line 3-3 in FIG. 1.

In FIGS. 1 to 3, an engine body 1 of an internal combustion engine E comprises a crankcase 2, a cylinder block 3 extending obliquely upward from one side of the crankcase 2, and a cylinder head 4 joined to an upper end surface of the cylinder block 3. The crankcase 2 houses a crankshaft 6 supported on left and right sidewalls thereof via bearings 5 and 5. The crankshaft 6 is connected to a piston 7 fitted in a cylinder bore 3a of the cylinder block 3 via a connecting rod 8. A flywheel 10 is secured to one end of the crankshaft 6 protruding outside the crankcase 2. An annular cooling fan 11 is secured to an outer side surface of the flywheel 10. A starting cylinder shaft 12 protruding axially outward from the cooling fan 11 is secured to a center of the flywheel 10. A known recoil starter 13 that can engage the starting cylinder shaft 12 to crank the crankshaft 6 is mounted to the crankcase 2 via a bracket 14. The other end of the crankshaft 6 protrudes outside the other sidewall of the crankcase 2 as an output end.

In the cylinder head 4, a combustion chamber 15 connecting to the cylinder bore 3a, and an intake port 16i and an exhaust port 16e having inner ends opening into the combustion chamber 15 are formed, and also an intake valve 17i and an exhaust valve 17e that open and close the intake port 16i and the exhaust port 16e are provided. A valve operating system 20 that opens and closes these intake valve 17i and the exhaust valve 17e is provided on a region from the crankcase 2 to the cylinder head 4.

This valve operating system 20 will be described.

In FIGS. 1 to 3, the valve operating system 20 includes: a camshaft 26 that is supported on the left and right sidewalls of the crankcase 2 and driven by the crankshaft 6 via a timing transmission device 25; an intake tappet 27i and an exhaust tappet 27e that are axially slidably supported by the cylinder block 3 to cause flanges 27ia and 27ea at lower ends to abut against an intake cam 26iand an exhaust cam 26e of the camshaft 26 in a way to allow sliding contact; an intake push rod 28i and an exhaust push rod 28e that have lower ends connecting to upper ends of the intake tappet 27i and the exhaust tappet 27e and upper ends extending above the cylinder head 4; and an intake rocker arm 29i and an exhaust rocker arm 29e that are oscillably supported by a pair of spherical support members 33 and 33 secured to the cylinder head 4. The intake rocker arm 29i is placed so that one end thereof abuts against a head of the intake valve 17i and the other end connects to an upper end of the intake push rod 28i. The exhaust rocker arm 29e is placed so that one end thereof abuts against a head of the exhaust valve 17e and the other end connects to an upper end of the exhaust push rod 28e.

Thus, when the intake cam 26i and the exhaust cam 26e push up the intake tappet 27i and the exhaust tappet 27e, respectively, the intake push rod 28i and the exhaust push rod 28e that move along with these tappets cause the intake rocker arm 29i and the exhaust rocker arm 29e to oscillate in opening directions of the intake valve 17i and the exhaust valve 17e. An intake valve spring 30i and an exhaust valve spring 30e that urge the intake valve 17i and the exhaust valve 17e in closing directions are mounted to the intake valve 17i and the exhaust valve 17e, respectively. A head cover 18 that covers the valve operating system 20 including the intake rocker arm 29i and the exhaust rocker arm 29e and the like on the cylinder head 4, is joined to an upper end surface of the cylinder head 4.

Figure 4:
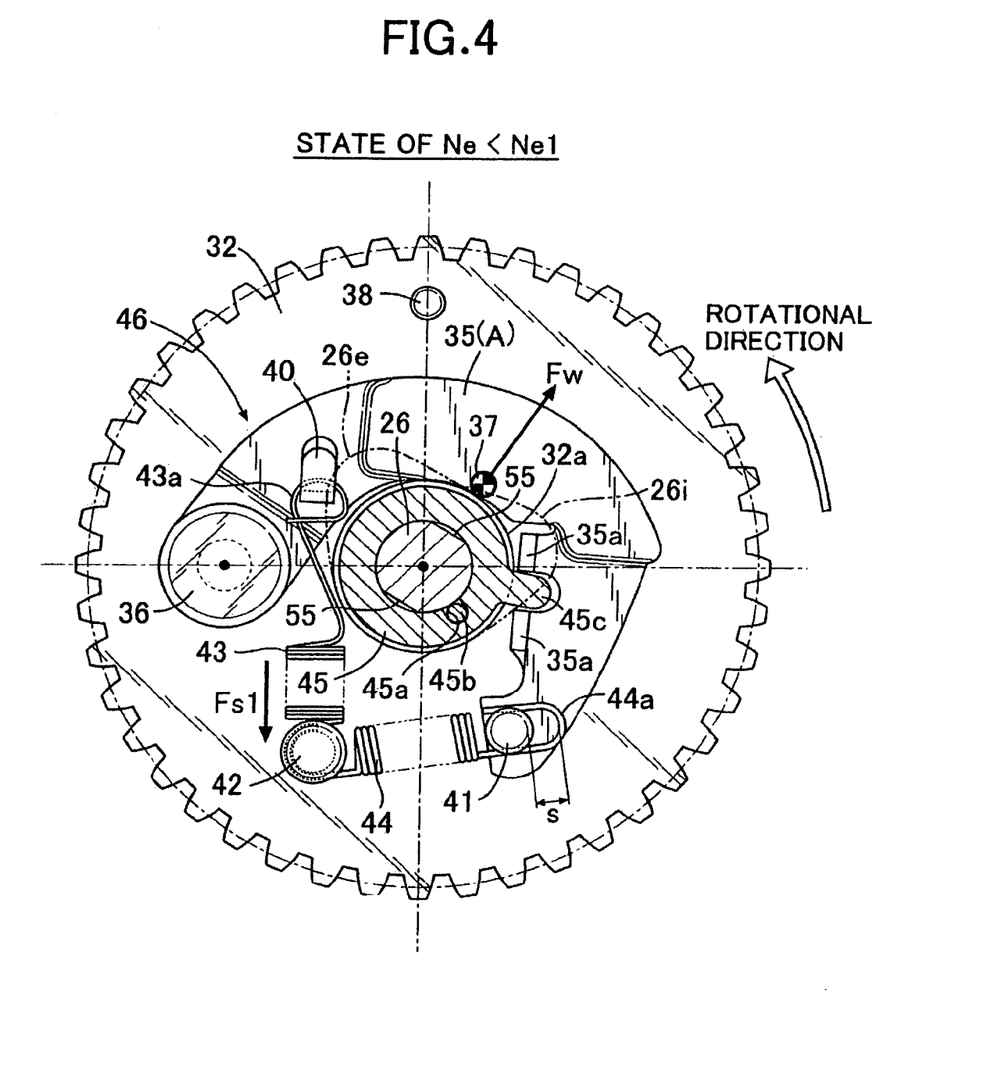
FIG. 4 is a sectional view taken along the line 4-4 in FIG. 3.

The timing transmission device 25 comprises a drive gear 31 secured to the crankshaft 6, and a driven gear 32 that is secured to the camshaft 26 and driven by the drive gear 31 at a 1/2 reduction ratio. As shown in FIGS. 3 and 4, one end of a centrifugal weight 35 formed into a U-shaped so as to surround a half circumference of the camshaft 26 is supported on the driven gear 32 via a pivot 36. The centrifugal weight 35 has a center of gravity 37 in a U-shaped bending portion thereof, and oscillates around the pivot 36 between a contracted position A (see FIGS. 4 and 5) where the U-shaped bending portion abuts against a hub 32a of the driven gear 32 and an extended position B (see FIG. 8) where an outer side surface of the U-shaped bending portion abuts against a stopper 38 protruding on a side surface of the driven gear 32. The centrifugal weight 35 is provided with a first movable connection 40 and a second movable connection 41 in a middle portion and an oscillation end thereof. Movable ends 43a and 44a of a first return spring 43 and a second return spring 44 having secured ends connected to a common secured connection 42 of the driven gear 32 and constituted by tension coil springs are connected to the first movable connection 40 and the second movable connection 41. The first return spring 43 is adapted to always urge the centrifugal weight 35 radially inward with a predetermined set load Fs1. A certain play S is provided between the movable end 44a of the second return spring 44 and the second movable connection 41. The second return spring 44 does not resist the oscillation of the centrifugal weight 35 until the centrifugal weight 35 oscillates radially outward through a predetermined angle from the contracted position A. In other words, the second return spring 44 is adapted to exert a repulsive force that urges the centrifugal weight 35 radially inward in cooperation with the first return spring 43 after the centrifugal weight 35 oscillates radially outward through the predetermined angle from the contracted position A.

As shown in FIG. 3, a drive ring 45, a decompression cam member 47, and an exhaust gas recirculation cam member 48 are fitted to the camshaft 26 in order from the side of the centrifugal weight 35 between the centrifugal weight 35 and the exhaust cam 26e. The drive ring 45 is rotatably fitted to an outer peripheral surface of the camshaft 26. The centrifugal weight 35 has a pair of connection pieces 35a and 35a placed so as to hold a connection protrusion 45c protruding from an outer peripheral surface of the drive ring 45 therebetween from opposite sides along a rotational direction of the drive ring 45. The radially outward oscillation of the centrifugal weight 35 causes the rotation of the drive ring 45. The drive ring 45 has an axial holding groove 45a in an inner peripheral surface thereof, and, by this holding grooves 45a, holds a roller 45b extending axially along the camshaft 26 between the driven gear 32 and the exhaust cam 26e. This roller 45b can roll on the outer peripheral surface of the camshaft 26 with a rotation of the drive ring 45 relative to the camshaft 26.

Figure 5:
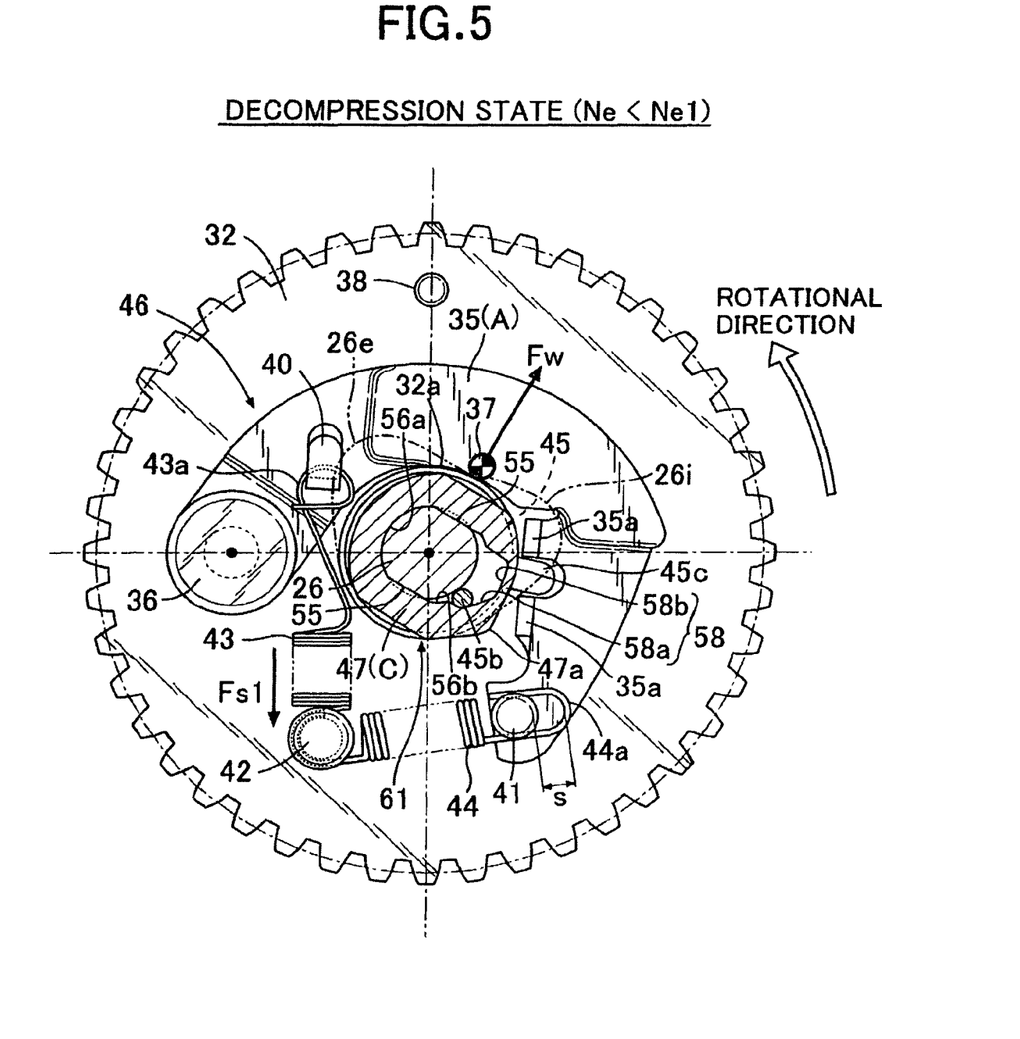
FIG. 5 is a sectional view taken along the line 5-5 in FIG. 3.
Figure 6:
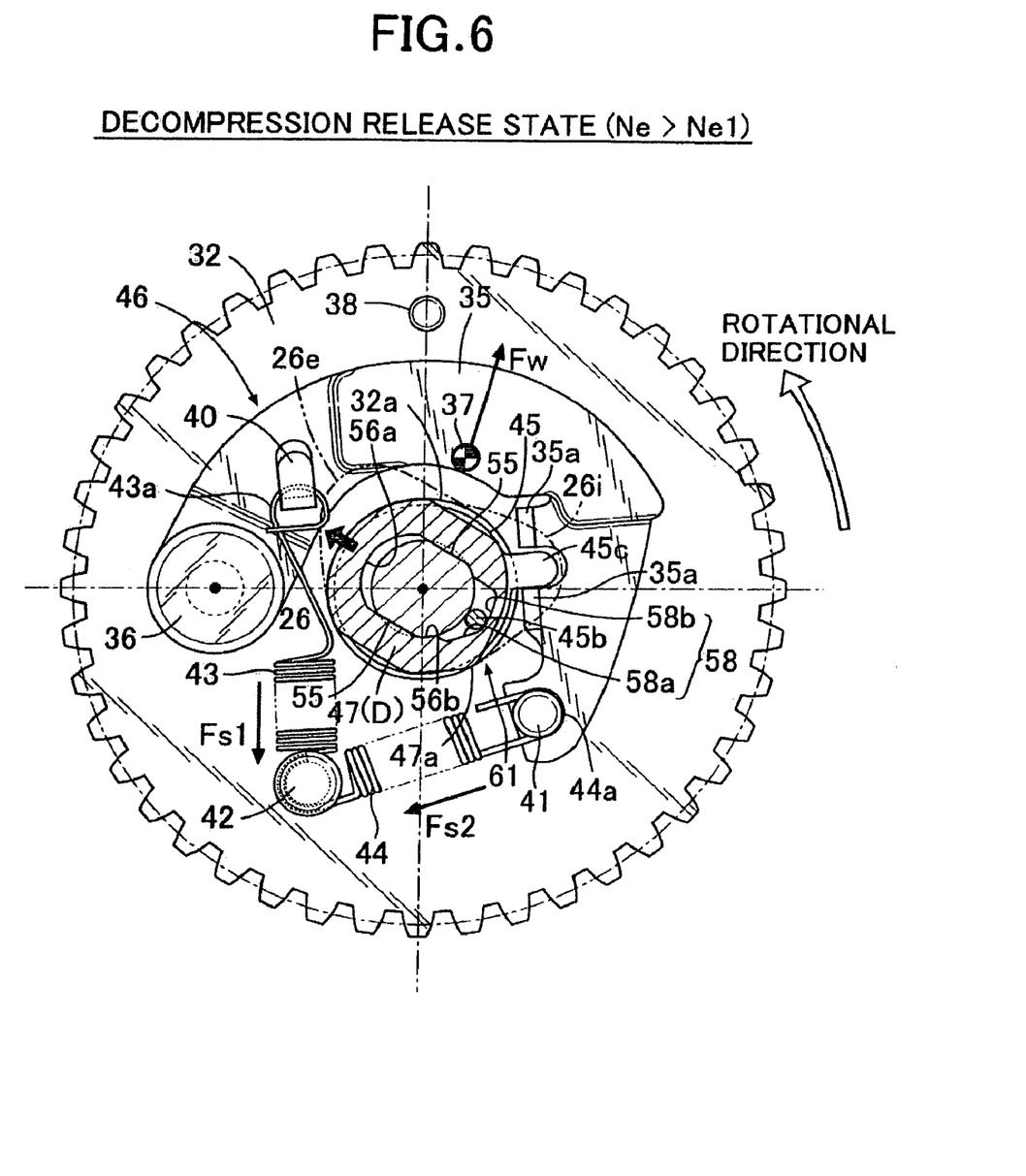
FIG. 6 is a view explaining an operation corresponding to FIG. 5.
Figure 7:
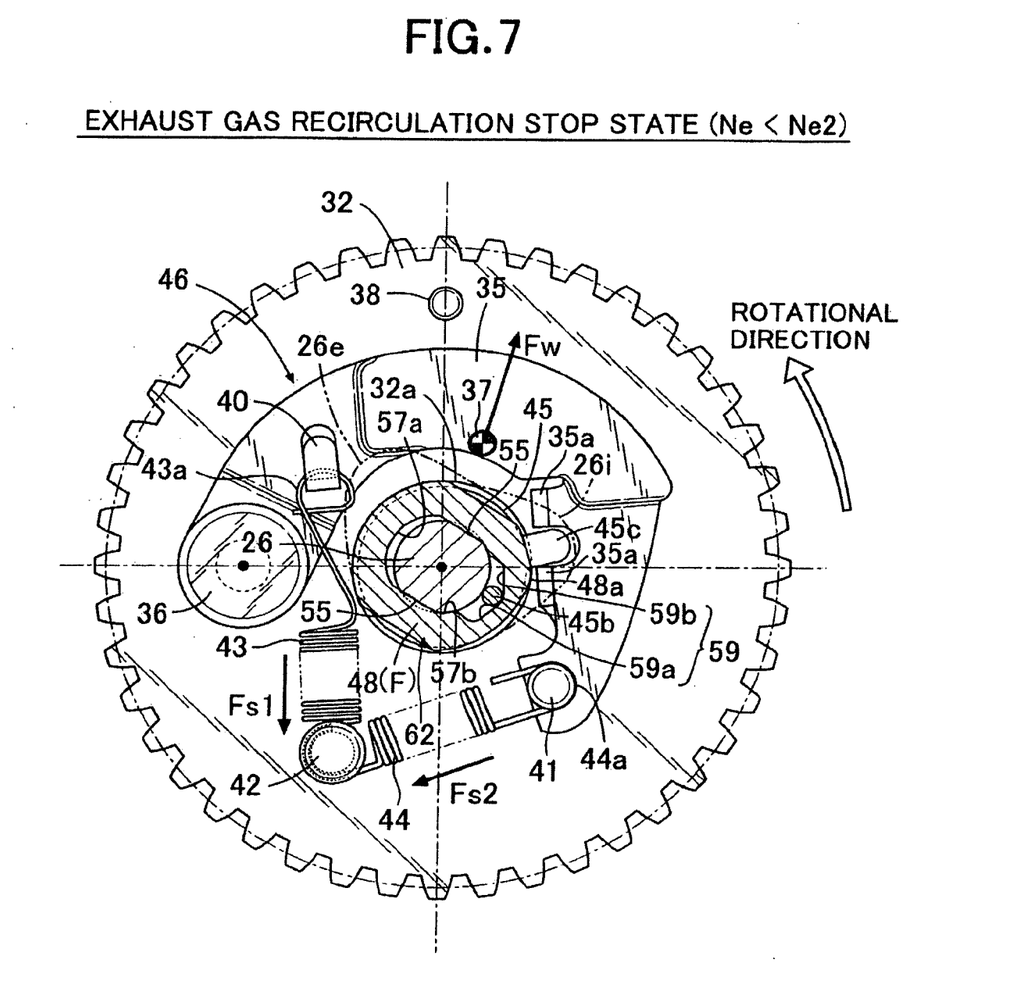
FIG. 7 is a sectional view taken along the line 7-7 in FIG. 3.
Figure 8:
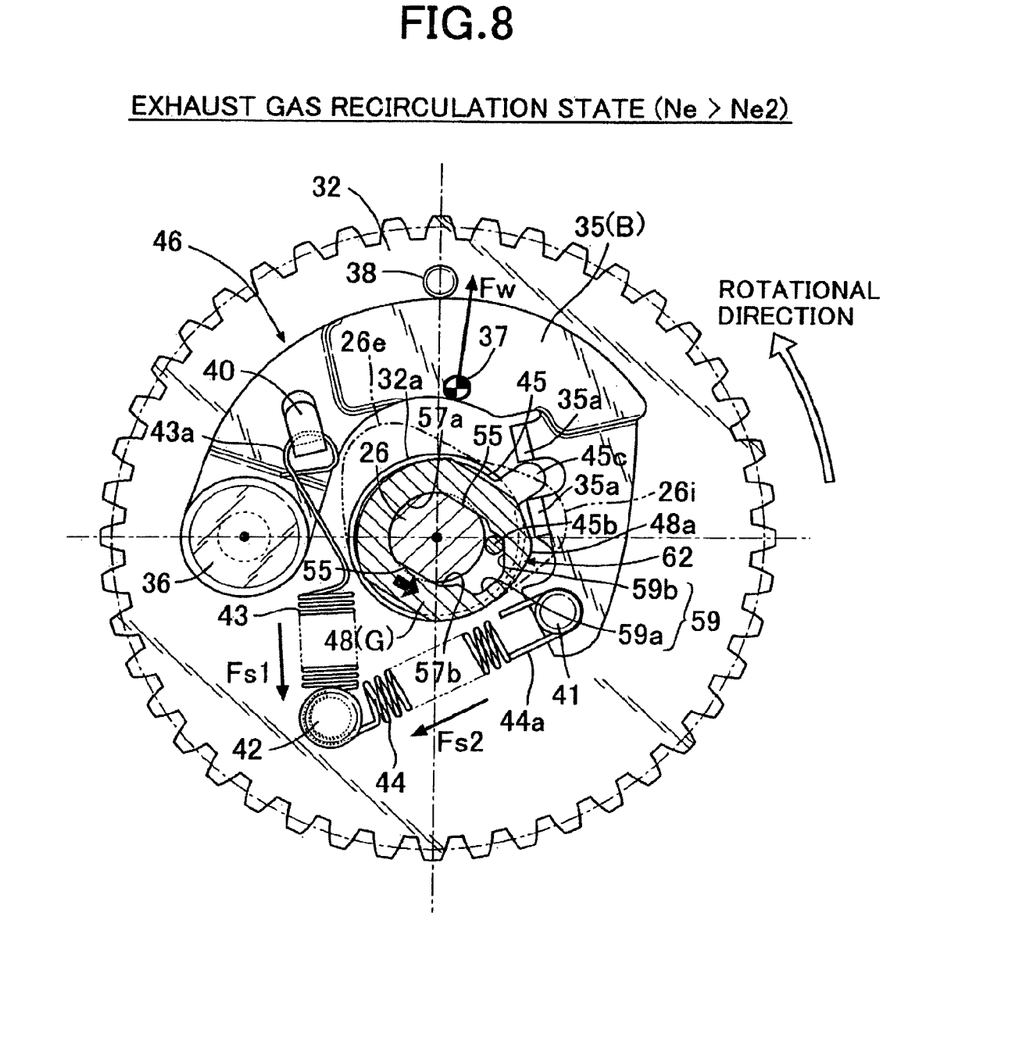
FIG. 8 is a view explaining an operation corresponding to FIG. 7.

In FIGS. 5 to 8, the decompression cam member 47 and the exhaust gas recirculation cam member 48 are fitted to a pair of guide surfaces 55 and 55 formed on opposite side surfaces of the camshaft 26 and parallel to each other so that these cam members slide along a diameter line of the camshaft 26. This allows the decompression cam member 47 to slide along the guide surfaces 55 and 55 between an operative position C (FIG. 5) and an inoperative position D (FIG. 6). The operative position C and the inoperative position D are determined by inner end surfaces 56a and 56b of the decompression cam member 47 orthogonal to the guide surfaces 55 and 55 and abutting against the outer peripheral surface of the camshaft 26. The exhaust gas recirculation cam member 48 can slide along the guide surfaces 55 and 55 between an inoperative position F (FIG. 7) and an operative position G (FIG. 8). The inoperative position F and the operative position G are determined by inner end surfaces 57a and 57b of the exhaust gas recirculation cam member 48 orthogonal to the guide surfaces 55 and 55 and abutting against the outer peripheral surface of the camshaft 26.

The decompression cam member 47 and the exhaust gas recirculation cam member 48 integrally have, on outer peripheral surfaces thereof, convex cams 47a and 48a much lower than a nose of the exhaust cam 26e. The convex cams 47a and 48a protrude outward beyond a base circle of the exhaust cam 26e in the operative positions C and G, and retract into the base circle in the inoperative positions D and F. The convex cam 47a of the decompression cam member 47 is placed so as to push up the exhaust tappet 27e in a compression stroke of the engine when the convex cam 47a is in the operative position C. The convex cam 48a of the exhaust gas recirculation cam member 48 is placed so as to push up the exhaust tappet 27e in an intake stroke of the engine when the convex cam 48a is in the operative position G.

As shown in FIGS. 5 and 6, a recessed cam 58 that cooperates with the roller 45b is formed in a center part of the inner end surface 56b of the decompression cam member 47 on the side of the convex cam 47a. The recessed cam 58 includes: an inclined surface 58a that is pressed by the roller 45b to force the decompression cam member 47 into the operative position C, when the centrifugal weight 35 is held in the contracted position A by an urging force of the first return spring 43; and an arcuate bottom surface 58b that prevents interference with the roller 45b and allows the decompression cam member 47 to move to the inoperative position D, after the centrifugal weight 35 rotates through a predetermined angle or more from the contracted position A (a state in FIG. 6). By forming the recessed cam 58, a center of gravity of the decompression cam member 47 is offset from the center thereof to an opposite side from the recessed cam 58. When the roller 45b comes to a position facing the arcuate bottom surface 58b, the decompression cam member 47 moves to the inoperative position D by a centrifugal force acting on the center of gravity.

On the other hand, a recessed cam 59 that cooperates with the roller 45b is formed in a center part of the inner end surface 57b of the exhaust gas recirculation cam member 48 on the side of the convex cam 48a. The recessed cam 59 includes: an arcuate bottom surface 59a that prevents interference with the roller 45b and allows the exhaust gas recirculation cam member 48 to move to the inoperative position F during rotation of the centrifugal weight 35 from the contracted position A through a predetermined angle; and an inclined surface 59b that is pressed by the roller 45b to force the exhaust gas recirculation cam member 48 into the operative position G when the centrifugal weight 35 rotates radially outward through a predetermined angle or more by a centrifugal force. By forming the recessed cam 59, a center of gravity of the exhaust gas recirculation cam member 48 is offset from the center thereof to an opposite side from the recessed cam 59. When the roller 45b is in a position facing the arcuate bottom surface 59a, the exhaust gas recirculation cam member 48 moves to the operative position G by a centrifugal force acting on the center of gravity.

In the above description, the centrifugal weight 35, the first return spring 43 and the second return spring 44, and the drive ring 45 cooperate with one another to constitute a common centrifugal mechanism 46 that operates the decompression cam member 47 and the exhaust gas recirculation cam member 48. The centrifugal mechanism 46, the roller 45b, and the decompression cam member 47 constitute a decompression device 61, and the centrifugal mechanism 46 and the exhaust gas recirculation cam member 48 constitute an exhaust gas recirculation device 62.

Referring again to FIG. 2, an ignition plug 21 whose electrode faces the combustion chamber 15 is screwed into the cylinder head 4. A carburetor 22 connecting to an outer end of the intake port 16i is mounted to the cylinder head 4. An air cleaner 64 is connected to an air inlet of this carburetor 22. An exhaust pipe 65 connecting to an outer end of the exhaust port 16e is mounted to the cylinder head 4. The exhaust pipe 65 is relatively short, and an exhaust muffler 23 being equipped therewith a three way catalyst converter 66 is connected to a downstream end of the exhaust pipe 65.

A valve box 67 is formed in the head cover 18 that is coupled to an upper end of the cylinder head 4 and covers the valve operating system 20. This valve box 67 is constituted by a lower box half body 67a integrally formed with a ceiling wall of the head cover 18 and having an open upper surface and an upper box half body 67b coupled to the lower box half body 67a by a bolt. A joint pipe 69 to which an air tube 68 extending from the air cleaner 64 is connected is integrally formed with one side of the upper box half body 67b. The lower box half body 67a communicates with the intake port 16i via an air hole 70 provided in the cylinder head 4 and the head cover 18. The valve box 67, the air tube 68, and the air hole 70 constitute a secondary air passage 71.

In the valve box 67, a one-way valve 73 is provided that is constituted by a reed valve and opened when negative pressure is created in the exhaust port 16e to bring the secondary air passage 71 into communication. The one-way valve 73 is held between the lower and upper box half bodies 67a and 67b, and includes a diaphragm plate 74 that partitions the inside of the valve box 67 into an upstream chamber 75a on a side of the air tube 68 and a downstream chamber 75b on a side of the air hole 70. This diaphragm plate 74 has a valve hole 76 that provide communication between the chambers 75a and 75b, and a reed valve plate 77 that opens and closes the valve hole 76 and a stopper plate 78 that restricts an opening limit of the reed valve plate 77 are mounted to the diaphragm plate 74 on a side of the downstream chamber 75b by a screw 79 or a rivet. The reed valve plate 77 is generally brought into tight contact with the diaphragm plate 74 by its elasticity to close the valve hole 76, and when pressure in the downstream chamber 75b becomes lower than that in the upstream side, the pressure difference causes the reed valve plate 77 to bend toward the stopper plate 78 side to open the valve hole 76.

Next, an operation of this embodiment will be described.

Figure 10:
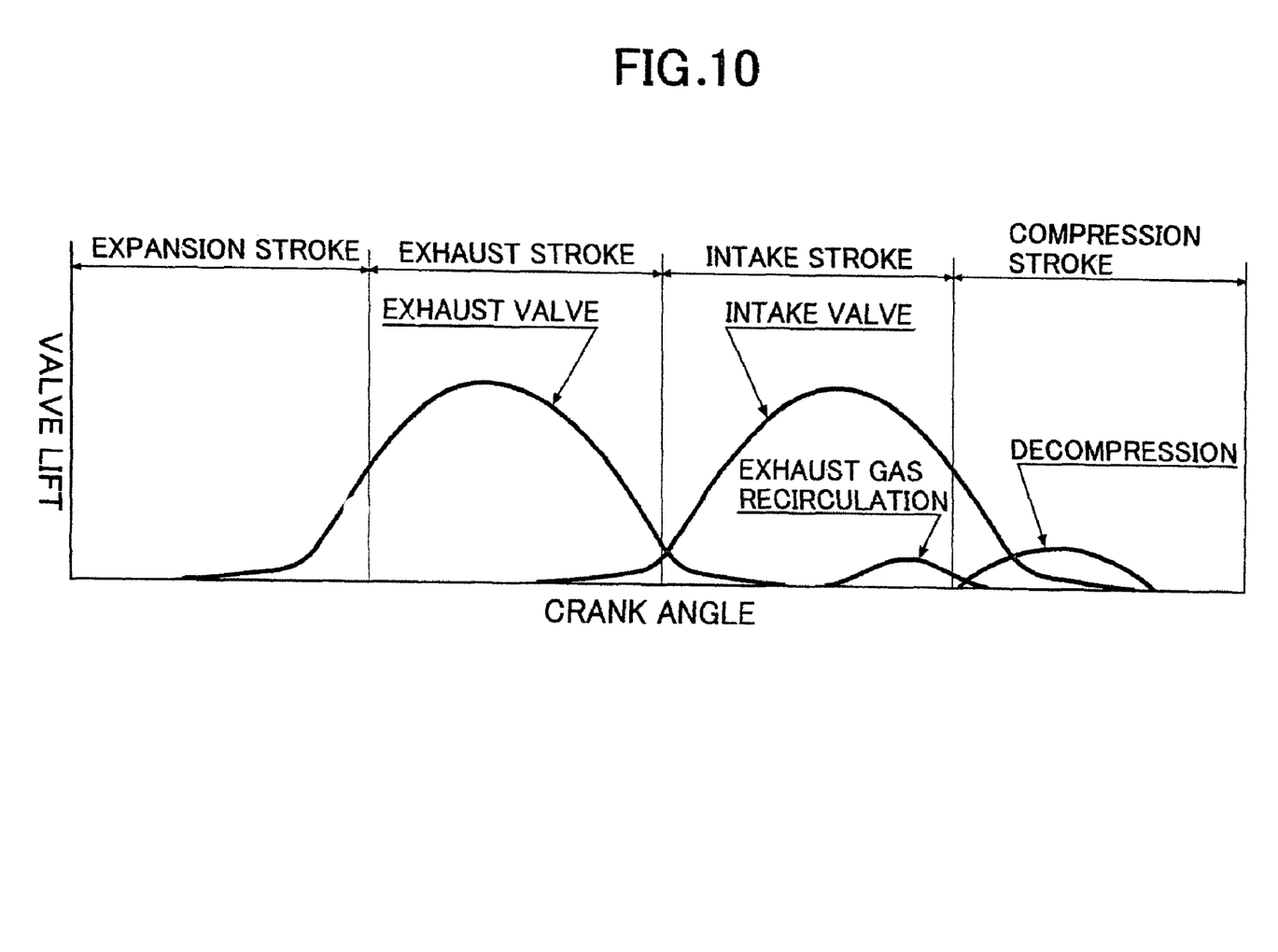
FIG. 10 is a diagram showing a relationship between a rotation angle of a crankshaft and opening/closing timings of an intake valve and an exhaust valve.

When the crankshaft 6 rotates, the camshaft 26 is driven by the crankshaft 6 via the timing transmission device 25 at a 1/2 reduction ratio. In the intake stroke, the intake cam 26i pushes up the intake push rod 28i via the intake tappet 27i, causes the intake rocker arm 29i to oscillate, and forces the intake valve 17i to open against an urging force of the intake valve spring 30i. In the exhaust stroke, the exhaust cam 26e pushes up the exhaust push rod 28e via the exhaust tappet 27e, causes the exhaust rocker arm 29e to oscillate, and forces the exhaust valve 17e to open against an urging force of the exhaust valve spring 30e. Such opening/closing timings of the intake valve 17i and the exhaust valve 17e are shown in FIG. 10.

Figure 9:
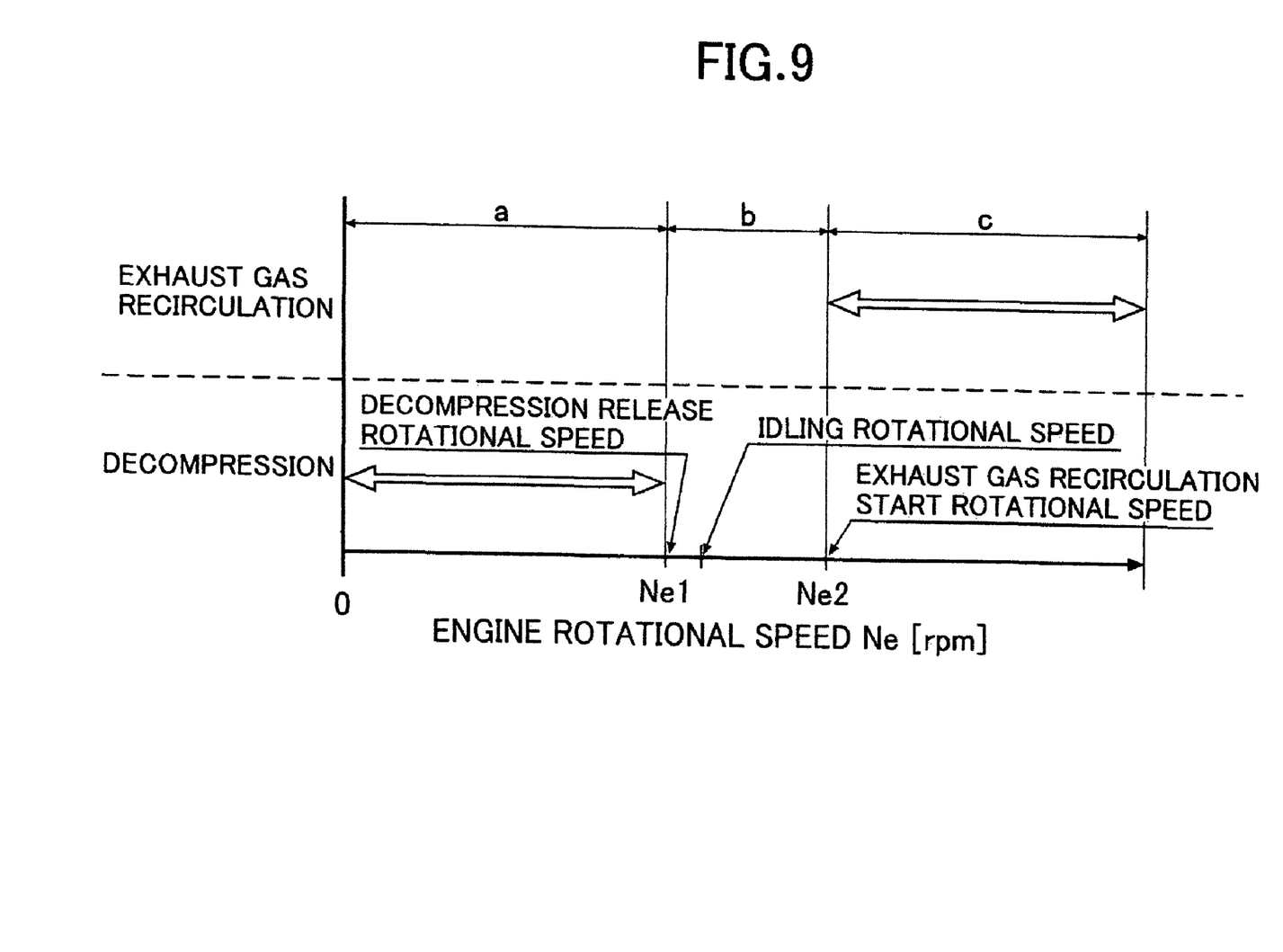
FIG. 9 is a diagram showing operation regions of a decompression cam member and an exhaust gas recirculation cam member.

In FIG. 9, the centrifugal weight 35 is held in the contracted position A by the set load Fs1 of the first return spring 43 as shown in FIGS. 4 and 5 in a starting rotation region a of the engine from the engine rotational speed Ne of zero to a predetermined rotational speed Ne1 lower than an idling rotational speed. At this time, the centrifugal weight 35 causes the roller 45b of the drive ring 45 positioned via the connection protrusion 45c and the connection pieces 35a and 35a that engage each other, to press the inclined surface 58a of the recessed cam 58 of the decompression cam member 47. Thus, the decompression cam member 47 is held in the operative position C where the convex cam 47a protrudes outward beyond the base circle of the exhaust cam 26e. Therefore, if the recoil starter 13 is operated to start the internal combustion engine E, the crankshaft 6 is cranked from the starter 13 via the starting cylinder shaft 12, and at the same time, the camshaft 26 is driven via the timing transmission device 25. Consequently, as described above, in the compression stroke of the piston 7, the convex cam 47a of the decompression cam member 47 slightly pushes up the exhaust tappet 27e to slightly open the exhaust valve 17e via the exhaust push rod 28e and the exhaust rocker arm 29e. The timing at this time is shown in FIG. 10. As a result, a part of compression gas in the cylinder bore 3a is discharged through the exhaust port 16e to prevent an increase in a compression pressure of the gas, thus reducing an operation load of the starter 13. Therefore, the crankshaft 6 can be cranked relatively lightly and swiftly, thereby allowing easy starting of the engine.

When the engine starts and the engine rotational speed Ne exits the starting rotation region a, as shown in FIG. 6, moment of the centrifugal weight 35 around the pivot 36 by a centrifugal force Fw overcomes moment of the centrifugal weight 35 around the pivot 36 by the set load Fs1 of the first return spring 43, to cause the centrifugal weight 35 to oscillate radially outward from the contracted position A. Such oscillation is transmitted from the connection piece 35a to the connection protrusion 45c, to rotate the drive ring 45 counterclockwise and move the roller 45b to a position facing the bottom surface 58b of the recessed cam 58 of the exhaust gas recirculation cam member 48. Thus, the decompression cam member 47 moves to the inoperative position D by the centrifugal force without interference by the roller 45b, thereby retracting the convex cam 47a into the base circle of the exhaust cam 26e.

During this process, in the exhaust gas recirculation cam member 48, the bottom surface 59a of the recessed cam 59 faces the roller 45b of the drive ring 45 as shown in FIG. 7, and thus the exhaust gas recirculation cam member 48 is held in the inoperative position F by the centrifugal force without interference by the roller 45b, thereby retracting the convex cam 48a into the base circle of the exhaust cam 26e.

Thus, the exhaust valve 17e is controlled to be opened and closed only depending on the operation of the exhaust cam 26e as usual. Such a state continues in a low speed operation region b of the engine where the engine rotational speed Ne is Ne1 to Ne2. With the movement of the centrifugal weight 35 at about the time when the engine rotational speed Ne reaches Ne2, as shown in FIG. 7, the play S between the second movable connection 41 of the centrifugal weight 35 and the movable end 44a of the second return spring 44 disappears, so that action of the second return spring 44 on the centrifugal weight 35 starts. Thus, after that, the position of the centrifugal weight 35 is determined by a balance between moment of the centrifugal weight 35 around the pivot 36 due to a return force Fs1 of the first return spring 43 and a return force Fs2 of the second return spring 44, and moment of the centrifugal weight 35 around the pivot 36 due to the centrifugal force Fw, so that an oscillation speed of the centrifugal weight 35 according to an increase in the engine rotational speed Ne slows.

Next, when the engine rotational speed Ne exceeds Ne2 and the internal combustion engine E enters a high speed operation region C, the centrifugal weight 35 finally reaches the extended position B where the centrifugal weight 35 abuts against the stopper 38 on the driven gear 32, and the further counterclockwise rotation of the drive ring 45 accompanying with it causes the roller 45b to press the inclined surface 59b of the recessed cam 59 of the exhaust gas recirculation cam member 48 and move the exhaust gas recirculation cam member 48 to the operative position G against the centrifugal force. Therefore, the convex cam 48a of the exhaust gas recirculation cam member 48 protrudes beyond the base circle of the exhaust cam 26e. Thus, as described above, in the intake stroke, the convex cam 48a of the exhaust gas recirculation cam member 48 slightly pushes up the exhaust tappet 27e to slightly open the exhaust valve 17e via the exhaust push rod 28e and the exhaust rocker arm 29e (see FIGS. 1 and 2). As a result, an exhaust gas remaining in the exhaust port 16e is drawn into the cylinder bore 3a, that is, the exhaust gas is recirculated. This exhaust gas can suppress an excessive increase in combustion temperature during combustion of air-fuel mixture in a later expansion stroke, to reduce a NOx concentration in the exhaust gas.

In the above-described intake stroke, as shown in FIGS. 1 and 2, the exhaust valve 17e is slightly opened to apply the negative pressure in the cylinder bore 3a to the exhaust port 16e. This negative pressure is transferred from the air hole 70 to the downstream chamber 75b of the valve box 67 to create the pressure difference between the downstream chamber 75b and the upstream chamber 75a. Thus, the reed valve plate 77 bends toward the downstream chamber 75b to open the valve hole 76 in the diaphragm plate 74. Specifically, the one-way valve 73 is opened to bring the secondary air passage 71 into communication with the exhaust port 16e, and thus secondary air filtered by the air cleaner 64 is drawn through the secondary air passage 71 into the exhaust port 16e and further into the cylinder bore 3a. In a short time thereafter, the intake stroke finishes and the intake and exhaust valves 17i and 17e are closed. Thus, the secondary air drawn into the exhaust port 16e remains in the exhaust port 16e. Thus, the remaining secondary air reacts with HC and CO in the exhaust gas exhausted to the exhaust port 16e in a later exhaust stroke to reduce HC and CO in the exhaust gas. Further, the secondary air drawn into the cylinder bore 3a increases charging efficiency of air/fuel mixture to increase an output of the engine E.

This can reduce HC and CO concentrations and also a NOx concentration in the exhaust gas and increase an output of the engine without using an air pump regardless of an exhaust system structure of the internal combustion engine. The exhaust gas passes through the exhaust muffler 23 including the three way catalyst converter 66, thereby further facilitating reduction and removal of NOx and oxidation and removal of HC and CO remaining in the exhaust gas.

Now, in the first embodiment, the valve box 67 that houses the one-way valve 73 is integrally formed with the head cover 18, thereby eliminating the need for a special support structure for the valve box 67 for the one-way valve 73.

Figure 11:
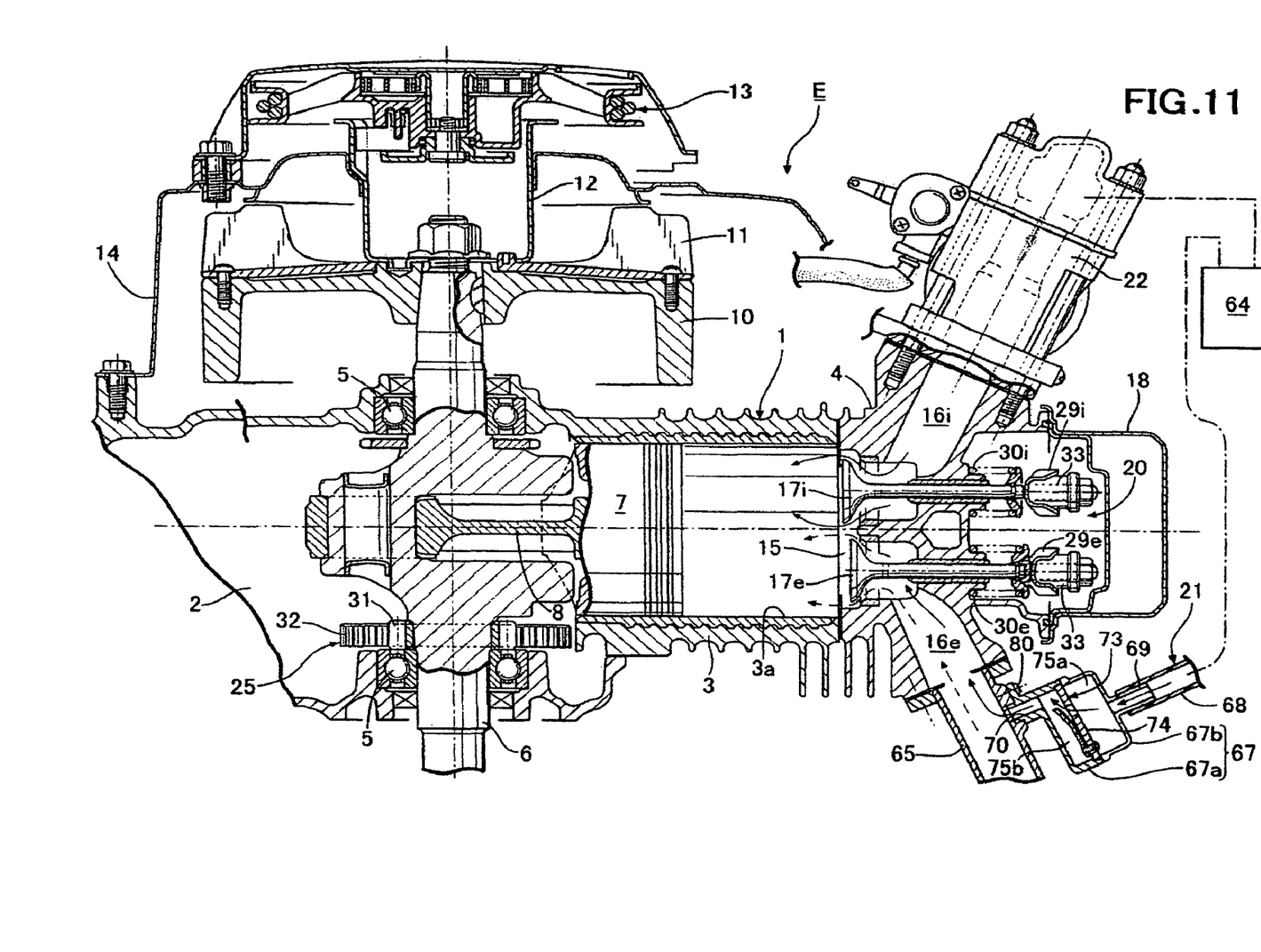
FIG. 11 is a view showing a second embodiment of the present invention and corresponding to FIG. 2.

Next, a second embodiment of the present invention shown in FIG. 11 will be explained.

In this second embodiment, a valve box 67 that houses a one-way valve 73 is secured by a screw 80 to an exhaust pipe 65 connected to a cylinder head 4, and a short air hole 70 connecting to a downstream chamber 75b of the valve box 67 opens into the exhaust pipe 65. Other configurations are the same as in the first embodiment. Thus, components corresponding to those in the first embodiment are denoted by the same reference numerals in FIG. 11, and overlapping descriptions will be omitted.

According to this second embodiment, the valve box 67 for the one-way valve 73 is mounted to the exhaust pipe 65, and thus the valve box 67 for the one-way valve 73 can be set using dead space around the exhaust pipe 65.

The present invention is not limited to the above-mentioned embodiments and may be modified in a variety of ways as long as the modifications do not depart from its gist. For example, the exhaust muffler 23 does not need to always be equipped therewith the three way catalyst converter 66.

The invention claimed is:

1. An exhaust emission control system for an internal combustion engine, comprising:
    an exhaust gas recirculation device that operates so as to partially open an exhaust valve to introduce an exhaust gas into a cylinder in an intake stroke, said exhaust gas recirculation device being inoperable until a predetermined engine speed is achieved;
    a secondary air passage that is connected to an exhaust passage and can supply secondary air to the exhaust passage; and
    a one-way valve that is provided in the secondary air passage and opened by negative pressure applied from the cylinder to the exhaust passage following an operation of the exhaust gas recirculation device in the intake stroke:
    wherein the secondary air from the secondary air passage is drawn into a cylinder bore of the cylinder by the one-way valve being opened by a negative pressure applied from the cylinder to the exhaust passage during the intake stroke.

2. The exhaust emission control system for an internal combustion engine according to claim 1, further comprising:
    a valve box;
    a head cover; and
    a cylinder head,
    wherein the valve box that houses the one-way valve is formed in the head cover coupled to the cylinder head.

3. The exhaust emission control system for an internal combustion engine according to claim 2, wherein said exhaust emission control system does not include an air pump.

4. The exhaust emission control system for an internal combustion engine according to claim 1, further comprising:
    a valve box;
    an exhaust pipe; and
    a cylinder head,
    wherein the valve box that houses the one-way valve is mounted to the exhaust pipe coupled to the cylinder head.

5. The exhaust emission control system for an internal combustion engine according to claim 4, wherein said exhaust emission control system does not include an air pump.

6. The exhaust emission control system for an internal combustion engine according to claim 1, wherein said exhaust emission control system does not include an air pump.

* * * * *